(12) United States Patent
Holmes

(10) Patent No.: US 9,631,651 B2
(45) Date of Patent: Apr. 25, 2017

(54) QUICK RELEASE CLAMP FOR STRETCHER CARRIERS AND THE LIKE

(71) Applicant: David A. Holmes, Norfolk, VA (US)

(72) Inventor: David A. Holmes, Norfolk, VA (US)

( * ) Notice: Subject to any disclaimer, the term of this patent is extended or adjusted under 35 U.S.C. 154(b) by 308 days.

(21) Appl. No.: 14/339,557

(22) Filed: Jul. 24, 2014

(65) Prior Publication Data

US 2016/0022514 A1    Jan. 28, 2016

(51) Int. Cl.
  *F16B 2/10*   (2006.01)
  *A61G 1/04*   (2006.01)
  *A61G 1/02*   (2006.01)

(52) U.S. Cl.
  CPC ............... *F16B 2/10* (2013.01); *A61G 1/04* (2013.01); *A61G 1/0293* (2013.01); *A61G 2203/78* (2013.01)

(58) Field of Classification Search
  CPC .......... A61G 1/02; A61G 1/0293; A61G 1/04; A61G 1/06; A61G 2203/78; B62B 3/02; Y10T 403/60; Y10T 403/602; Y10T 403/608; Y10T 403/595
  See application file for complete search history.

(56) References Cited

U.S. PATENT DOCUMENTS

| | | | |
|---|---|---|---|
| 6,238,130 B1 * | 5/2001 | Youngers | E02F 3/3627 37/468 |
| 6,332,748 B1 * | 12/2001 | Doering | E02F 3/3668 37/468 |
| 7,044,496 B2 | 5/2006 | Holmes | |
| 7,461,857 B2 | 12/2008 | Darling, III | |
| 8,387,963 B2 * | 3/2013 | Moutafis | F16B 2/18 269/196 |
| 8,505,959 B2 | 8/2013 | Darling, III | |
| 2012/0241571 A1 * | 9/2012 | Masionis | A61G 1/04 248/214 |

FOREIGN PATENT DOCUMENTS

WO    WO 2007/121478    * 10/2007 ............... A61G 1/06

* cited by examiner

*Primary Examiner* — Michael P Ferguson
(74) *Attorney, Agent, or Firm* — William G. Sykes

(57) ABSTRACT

A stretcher clamp mountable on a gurney designed to be quickly opened for inserting a cylindrical stretcher handle and then quickly closed. When closed, the stretcher clamp remains in a closed, locked position regardless of bumps and jolts received when the gurney is moved across rough terrain. When the gurney reaches its destination, the novel stretcher clamps are easily and reliably openable to release the stretcher handle therefrom. Unlike stretcher clamps of the prior art, the stretcher clamp of the invention is not prone to jamming caused by bending or other distortions during transit. The clamp has two major components: an elongated latch handle and an elongated handle retainer, both rotatively mounted in a rigid, U-shaped frame or base. These two components are interconnected by a linkage assembly that is rotatively connected to the elongated latch handle and the elongated handle retainer and positioned therebetween.

5 Claims, 9 Drawing Sheets

QUICK RELEASE CLAMP FOR STRETCHER CARRIERS AND THE LIKE

FIELD OF THE INVENTION

The invention pertains to clamps and, more particularly, to secure, quick release clamps useful for fastening a stretcher or the like to a stretcher carrier or similar conveyance.

BACKGROUND OF THE INVENTION

Stretchers, body boards and gurneys are frequently used for transporting patients to an emergency vehicle or to a treatment facility. Such devices suffer from various disadvantages. For instance, when transporting a patient by a hand carried stretcher, body board, or stokes basket, a bouncy effect is generally experienced during a walking or running gait. Carrying a relatively heavy patient over long distances can cause the bearers of the stretcher, body board, or stokes basket to fatigue. To overcome such difficulties, wheeled stretcher carriers have been devised to support a stretcher and allow rolling transportation of a patient on the stretcher to an emergency vehicle (i.e., ambulance) or to an aid station or other treatment facility.

Many stretcher carriers appear in the prior art. The one thing all stretcher carriers have in common is a clamp for securing a stretcher or the like to the carrier. In any emergency situation, time is of the essence. A clamp must allow an attendant to quickly and securely fasten the stretcher to the carrier. As a carrier may be called upon to traverse rough terrain, the clamp must hold securely when subjected to bumps and jolts during the transportation of the stretcher bound patients across rough terrain.

In addition, a good clamp must not be deformed in any manner so as to jam as the clamp and stretcher carrier traverse rough terrain.

Finally, a good clamp must readily be openable when it is time to remove the stretcher or the like from the stretcher carrier.

Clamps of the prior art have suffered from one or more of these problems.

It would, therefore, be desirable to provide a stretcher clamp that may be quickly closed to reliably secure a stretcher or the like to a stretcher carrier. The clamp should not open when the stretcher carrier traverses rough terrain nor should the clamp deform and/or jam. Finally, the clamp must be simple and fast to open.

DISCUSSION OF THE RELATED ART

Several stretcher carts and clamps therefor may be found in the prior art. For example, U.S. Pat. No. 7,044,496 for STRETCHER CART issued May 16, 2006 to David A. Holmes discloses a stretcher cart using clamps 27 (FIG. 1) to secure a stretcher to stretcher cart 1.

U.S. Pat. No. 7,461,857 for MULTIPURPOSE CLAMPS FOR UTILITY TABLE/CART/STRETCHER issued Dec. 9, 2008 to Charles W. Darling, III discloses a mission adaptable multi-purpose, collapsible portable cart/utility table, for use in emergency response and disaster situations, camping, hunting and other outdoor activities, which carries medical rescue carts, canoes, small boats, game, or hauled cargo by hand. The portable cart/utility table can be converted to a various uses and the portable cart/utility table can be folded down and transported within a wheeled bin, backpack, hand carried bag, canoe, or boat. It transports injured persons or cargo over long, rough terrain and it can be broken down into a carrying position, by hand or by back. The objects being carried can be held by clamps, by fasteners, or through the use of insertions with longitudinally extending channels. The portable cart/utility table can also be the basis of a transportable mobile field hospital deployable by land, sea, and air to reach very remote and rugged regions.

U.S. Pat. No. 8,505,959 for CART TRANSPORTABLE MOBILE MEDICAL CRITICAL CARE POINT OF NEED FIELD INSTALLATION UNITS issued Aug. 13, 2013 to Charles W. Darling, III teaches a cart transportable mobile medical emergency response facility includes a plurality of hand carried carts with cargo canisters with interchangeable components for establishing a decentralized mobile medical treatment facility at a disaster or other emergency area with a lack of usable hospital facilities. The rapidly deployable and accessible collection of carts and medical equipment delivers point-of-need critical care in the absence of conventional time consuming and complex assembly of medical response facilities. A stretched may be held to the cart by a clamp assembly, typically clamp assembly 200 best seen in FIG. 22.

None of the patents and published patent applications, taken singly, or in any combination are seen to teach or suggest the novel clamp of the present invention.

SUMMARY OF THE INVENTION

In accordance with the present invention there is provided a stretcher clamp mountable on a gurney or other conveyance. The novel stretcher clamp is designed to be quickly opened to allow insertion of a cylindrical stretcher handle and then quickly closed. When closed, the novel stretcher clamp remains in a closed, locked position regardless of bumps and jolts received when the gurney is moved across rough terrain. Accidental opening of the clamp by personnel near the gurney is minimized. When the gurney reaches its destination, the novel stretcher clamps are easily and reliably openable to release the stretcher handle therefrom. Unlike stretcher clamps of the prior art, the novel stretcher clamps of the invention are not prone to jamming caused by bending or other distortions of the clamp components caused by the bumping and jarring received while the clamp is closed and securing a stretcher handle.

The novel clamp has two major components: an elongated latch handle and an elongated handle retainer, both rotatively mounted in a rigid, U-shaped frame or base. These two components are interconnected by a linkage assembly that is rotatively connected to each end to a respective one of the elongated latch handle and the elongated handle retainer. Until the elongated latch handle is raised from its lock position against an upper surface of the elongated handle retainer, the elongated handle retainer cannot be opened.

It is, therefore, an object of the invention to provide a quick release stretcher clamp that may be quickly closed to secure a stretcher or the like to the stretcher carrier.

It is another object of the invention to provide a stretcher clamp that remains securely locked even when subjected to bumping and jarring.

It is an additional object of the invention to provide a stretcher clamp that may be quickly and reliably unlatched to free the stretcher being retained.

It is a further object of the invention to provide a stretcher clamp that is difficult to accidentally unlatch.

It is another objective of the invention to provide a stretcher clamp that with a single motion of the hand by lifting the elongated latch handle simultaneously unlocks and opens the clamp.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENT

The present invention provides a clamp for securing a stretcher or the like to a stretcher cart, gurney, or similar support structure. The novel clamp, when in a closed, locked orientation, securely grips a stretcher pole or handle or similar structure. When in the closed, locked orientation, it is difficult to unlock the clamp even when the clamp is subjected to bumping and jarring such as when the stretcher cart must move over rough or uneven terrain. Neither is it easy to unlock the clamp accidentally. However, the clamp is easily and quickly unlocked when necessary. Unlike clamps of the prior art, the clamp of the invention is not prone to jamming in a closed, locked orientation.

Figure 1A:
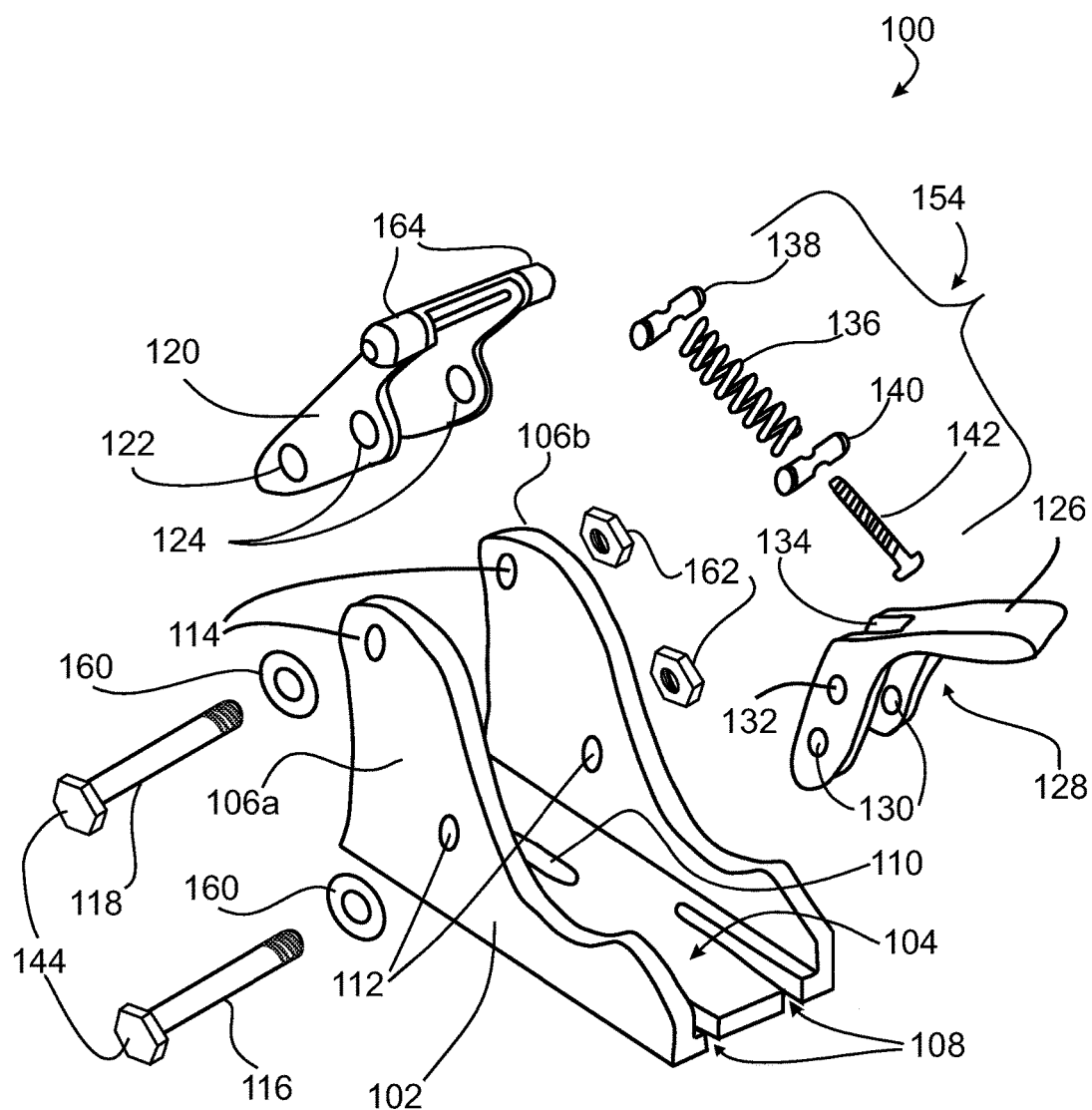
FIG. 1A is an exploded perspective, schematic view of the stretcher clamp in accordance with the invention.

Referring first to FIG. 1A, there is shown an exploded perspective, schematic view of the clamp of the invention, generally at reference number 100. Clamp 100 has a base 102 having a substantially U-shaped cross-section when viewed from the front or the back. Base 102 has a bottom 104 having a pair of narrow mounting slots 108 extending from a front edge rearward therefrom. In addition, base 102 has an elongate mounting slot 110 centrally disposed to and parallel to a pair of upstanding sides 106a, 106b.

An upstanding side 106a, 106b is disposed perpendicularly to base 102 at each edge thereof. Upstanding sides 106a, 106b each have an irregular, curvilinear upper edge.

Two pairs of holes 112, 114 are disposed in each of upstanding sides 106a, 106b, each pair of holes 112, 114, respectively being adapted to receive and retain substantially cylindrical axle assemblies 116, 118, respectively therein. As discussed hereinbelow, axle assemblies 116, 118 are typically affixed to upstanding sides 106a, 106b. In the embodiment chosen for purposes of disclosure, axle assemblies 116, 118 are implemented using hex head bolts, not specifically identified, flat washers 160 and a gland nut 162 to secure respective axle assemblies 116, 118 to respective upstanding sides 106a, 106b of U-shapes base 102.

An elongated latch handle 120 has a pair of holes 122 sized and adapted to receive axle 118 therethrough. Elongated latch handle 120 may freely rotate on axle assembly 118. A handle disposed at the front of elongated latch handle 120 has a pair of cylindrical handle tips 164 fastened to a handle shaft 150 that is in turn secured in holes, not specifically identified, in elongated handle latch 120.

Figure 1B:
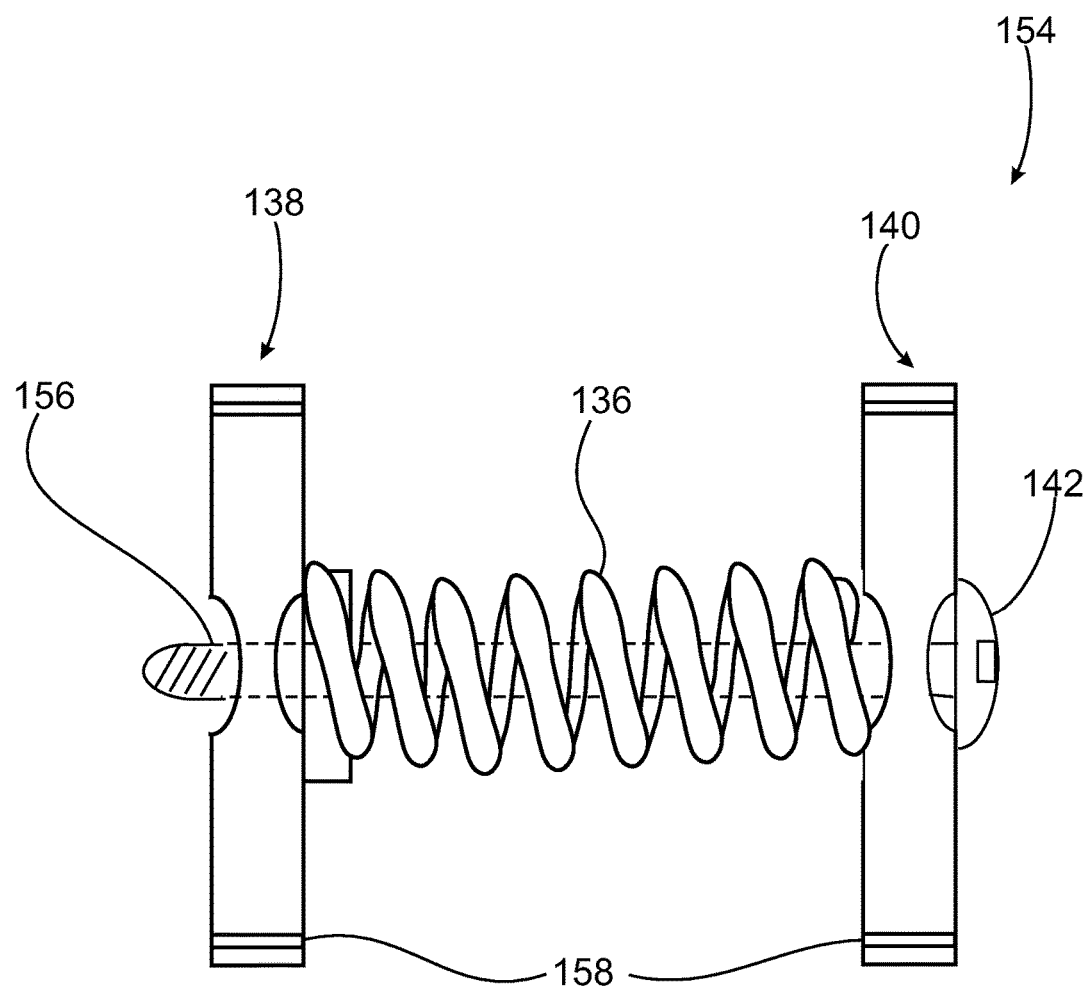
FIG. 1B is a detailed to plan, schematic view of a linkage assembly forming part of the stretcher clamp of FIG. 1A

Referring now also to FIG. 1B, there is shown a top plan, schematic view of a linkage assembly, generally at reference number 154. Linkage assembly 154 is formed from upper linkage component 138, lower linkage component 140, screw 142, and spring 136. Internal threads, not shown, in upper linkage component 138 capture threads 156 of screw 142 to hold the components of linkage assembly 154 together.

Referring again also to FIG. 1A, a second pair of holes 124 in elongated latch handle 120 is sized and configured to retain upper linkage component 138 therein. Split ring retainer 146, best seen in FIG. 2, seated in grooves 158 hold upper linkage component 138 in place.

An elongated handle retainer 126 has a pair of holes 130 sized and adapted to receive axle assembly 116 therein. Elongated handle retainer 126 may freely rotate on axle assembly 116.

Elongated handle retainer 126 has a second pair of holes 132 sized and adapted to retain lower linkage component 140 therein. Split ring retainers 146 seated in grooves 158 hold lower linkage component 140 in place. While split ring retainers (i.e., split washers) 146 have been used for purposes of disclosure, it will be recognized that other similar devices may alternately be used in their place. Consequently, the invention is not considered limited to split ring retainers chosen for purposes of disclosure. Rather, the invention is intended to include any and all suitable similar retaining devices.

Elongated handle retainer 126 has a curved lower surface 128. Curved lower surface 128 is adapted to retain a stretcher handle 148 (best seen in FIGS. 6, 7, and 8) between curved lower surface 128 and a curved portion 152 of an upper edge of base 102.

Figure 2:
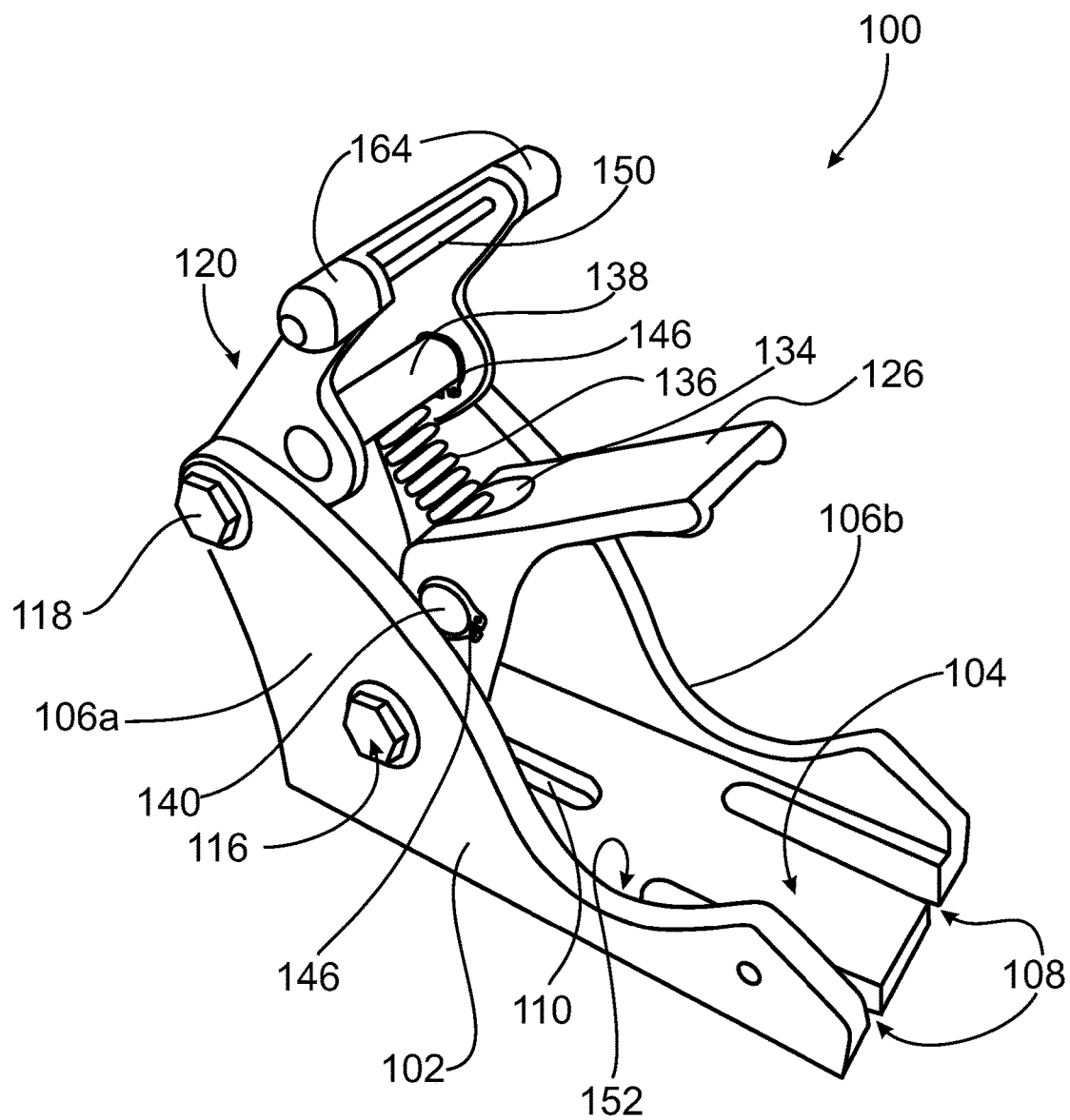
FIG. 2 is a perspective, schematic view of the stretcher clamp of FIG. 1A in an open, unlocked orientation.

Referring now also to FIG. 2, there is shown perspective, schematic view of the stretcher clamp 100 of FIG. 1 in an open, unlocked orientation.

Hex head 144 of axle assembly 118 may be seen holding elongated latch handle 120 in place within U-shaped base 102 using holes 114.

Upper linkage component 138 is secured to elongated handle component 120 using holes 124 and split ring retainers 146.

Linkage assembly 154 passes downward through elongated handle retainer 126 through back notch 134 therein.

Lower linkage component 140 is secured in holes 132 of elongated handle retainer 126 using spit ring retainers 146. Only a proximal end of lower linkage component 140 of linkage assemble 154 is visible in FIG. 2

Figure 3:
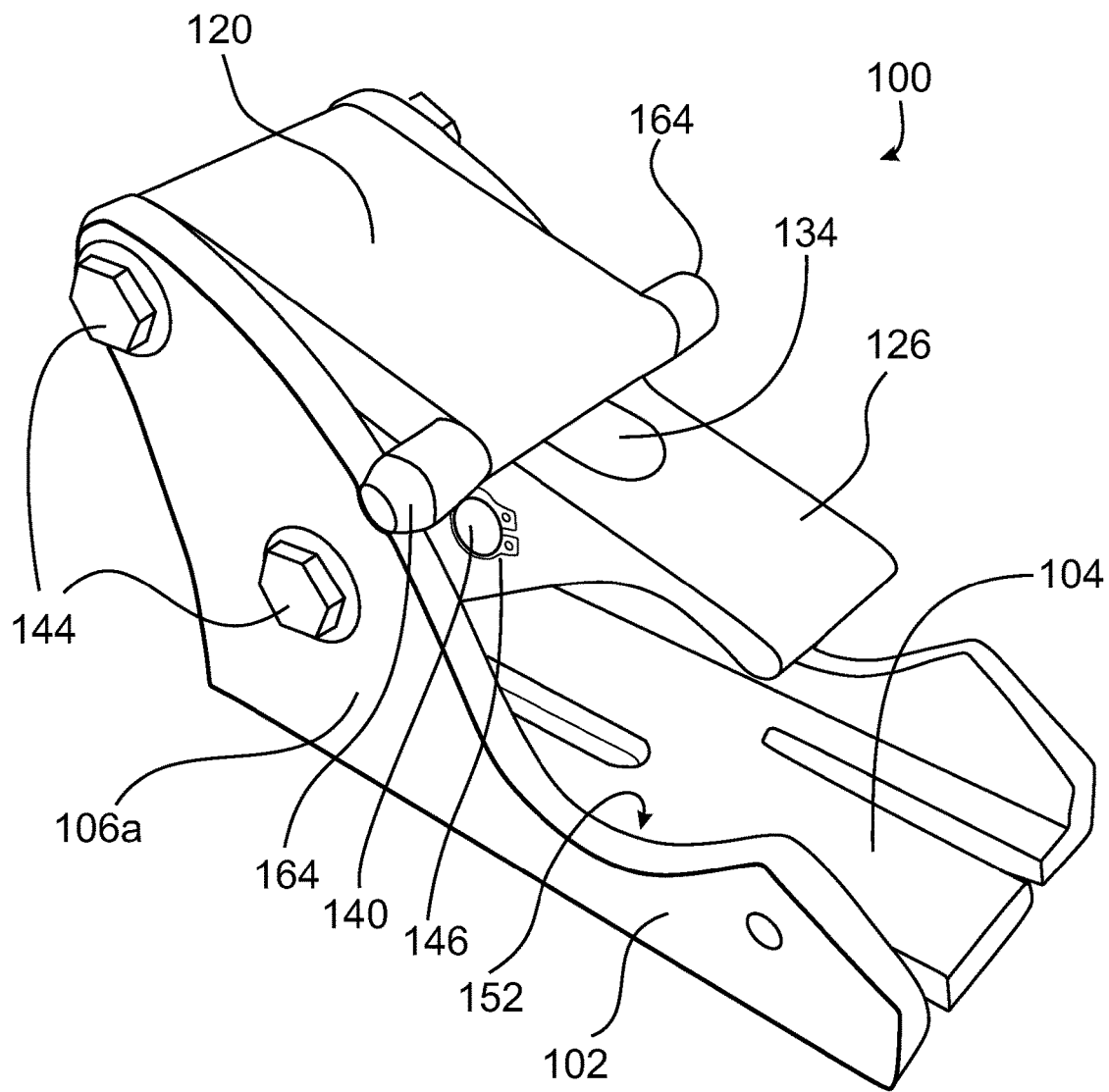
FIG. 3 is a perspective, schematic view of the stretcher clamp of FIG. 1A in a closed, locked orientation.
Figure 4:
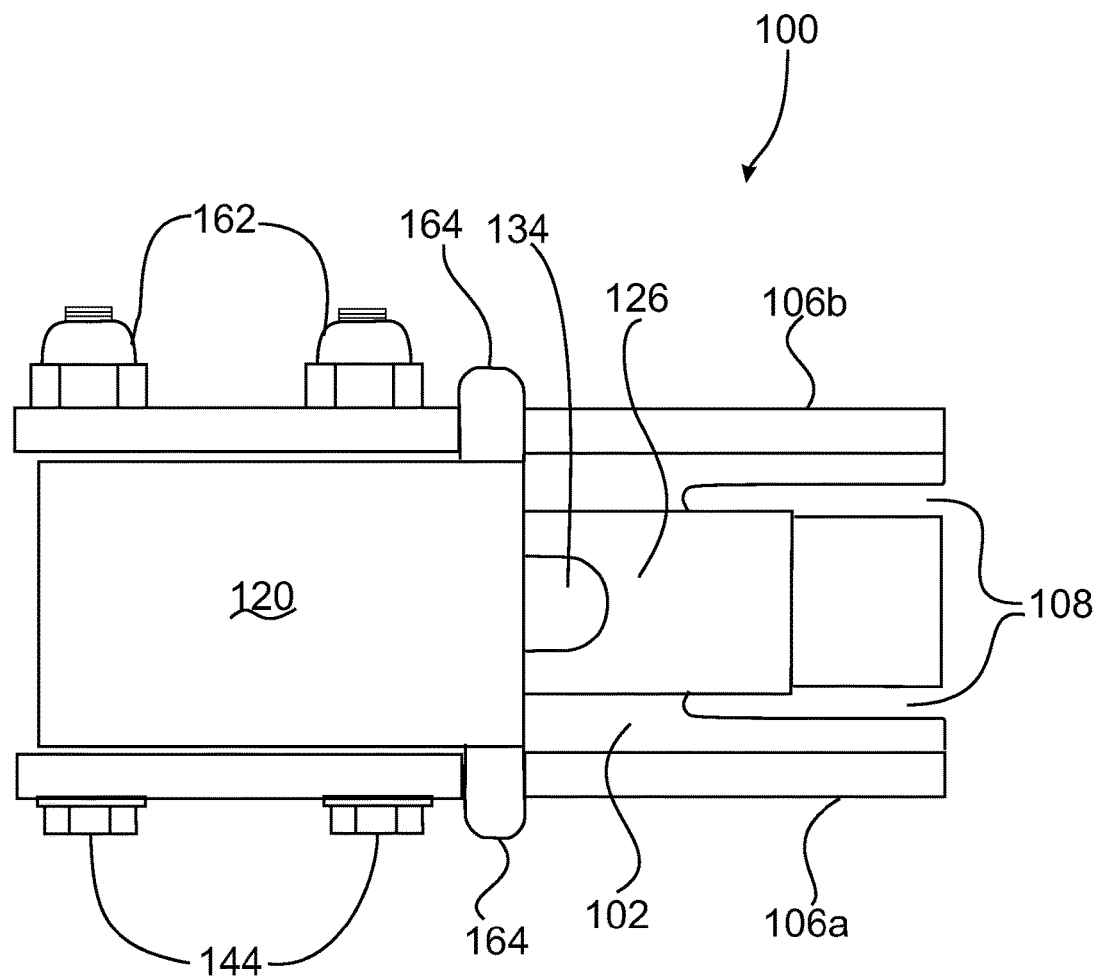
FIG. 4 is a top plan, schematic view of the stretcher clamp of FIG. 1A.
Figure 5:
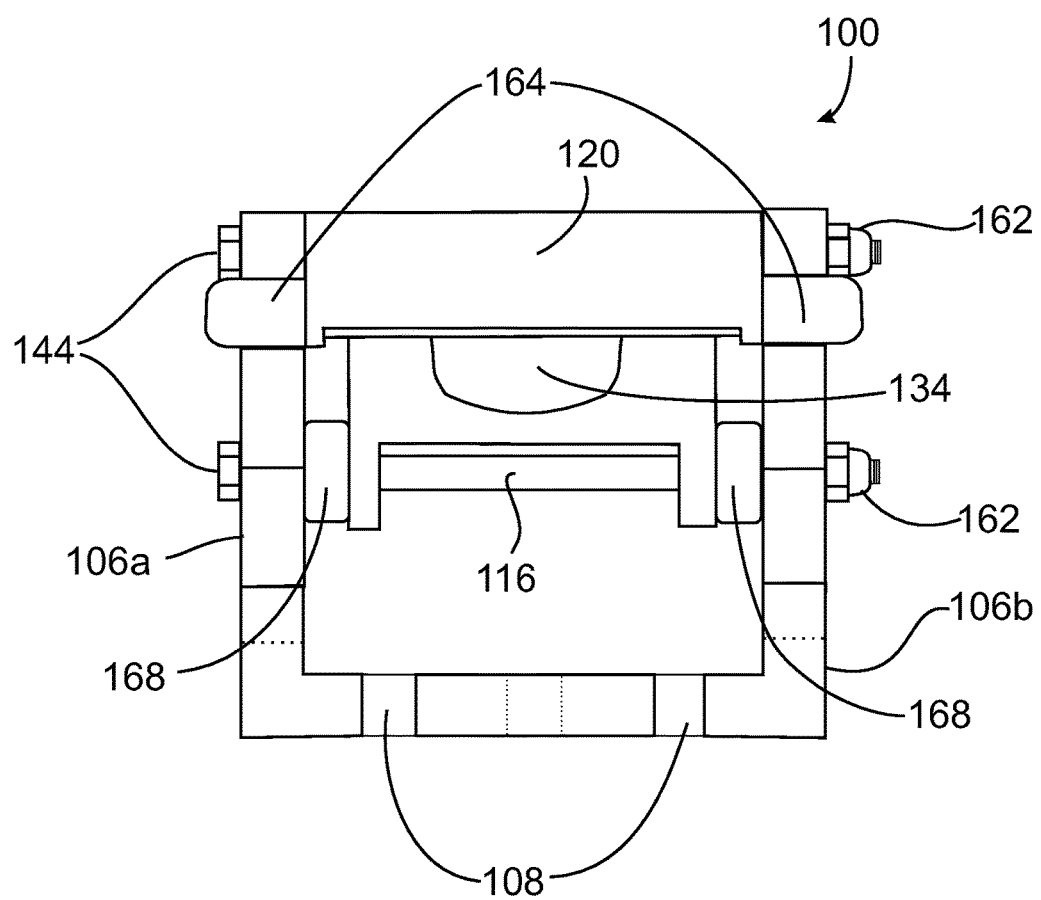
FIG. 5 is a front elevational, schematic view of the stretcher clamp of FIG. 1A.

Referring now also to FIGS. 3, 4, and 5, there are shown a perspective, schematic view of the stretcher clamp of FIG. 1A in a closed, locked orientation; a top plan, schematic view of the stretcher clamp of FIG. 1A, and a front elevational, schematic view of the stretcher clamp of FIG. 1A, respectively.

As may be seen in FIG. 3, elongated latch handle 120 lies relatively flat against an upper surface, not specifically identified, of elongated handle retainer 126.

Gland nuts 162 are visible in FIG. 4. While gland nuts are shown for purposes of disclosure, it will be recognized by those of skill in the art that alternate nuts or the like may be substitute for gland nuts. For example, a pair of jam nuts tightened against one another might be used. For this reason, it is not that the patent be limited to the gland nuts chosen for purposes of disclosure. Rather the patent is intended to include any and all suitable alternate devices capable of functioning as a lock nut.

In FIG. 5, a pair of spacers 168 is shown on axle assembly 116. Spacers 168 function to center elongated handle retainer 126 on axle assembly 116.

Figure 6:
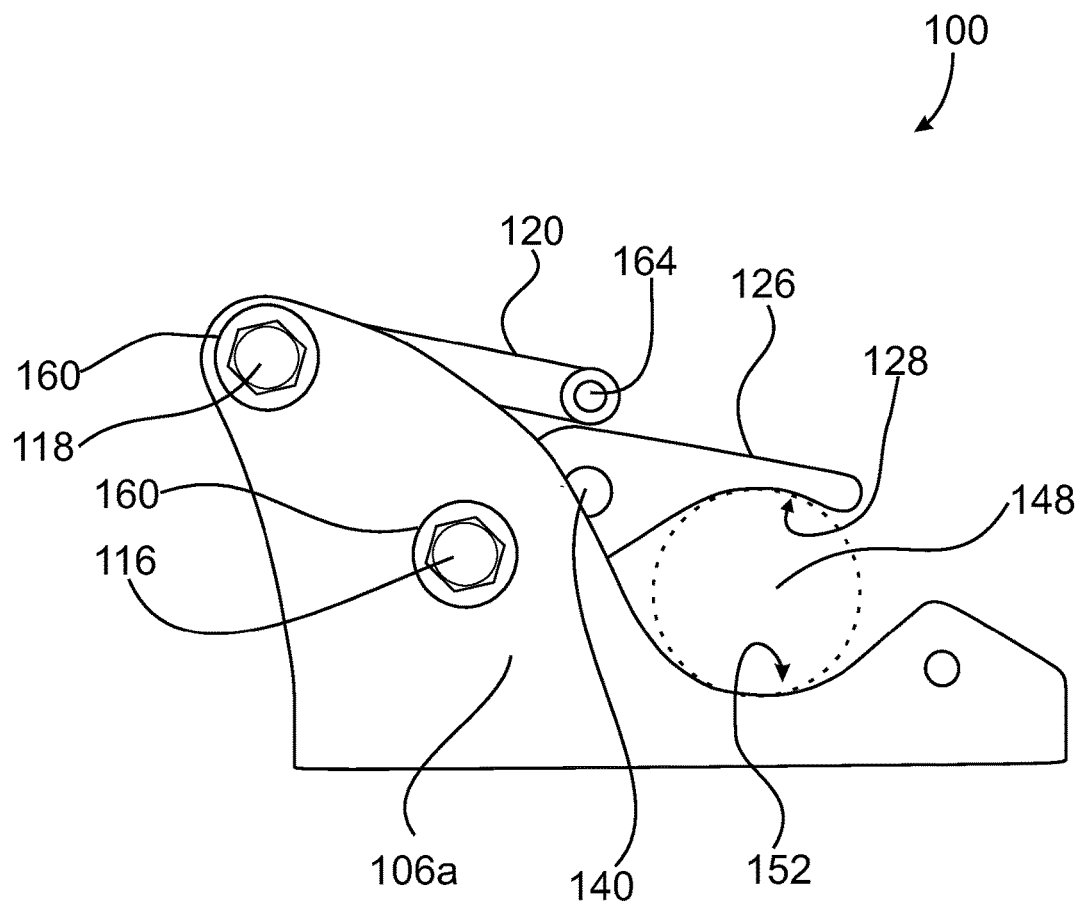
FIG. 6 is a side elevational, schematic view of the stretcher clamp of FIG. 1A.

Referring now also to FIG. 6, there is shown side elevational, schematic view of stretcher clamp 100 of FIG. 3. In FIG. 6, a stretcher handle 148 forming no part of the invention is shown gripped between the curved portion 152 of the upper edge of U-shaped base 102 and the lower surface 128 of elongated handle retainer 126.

Figure 7:
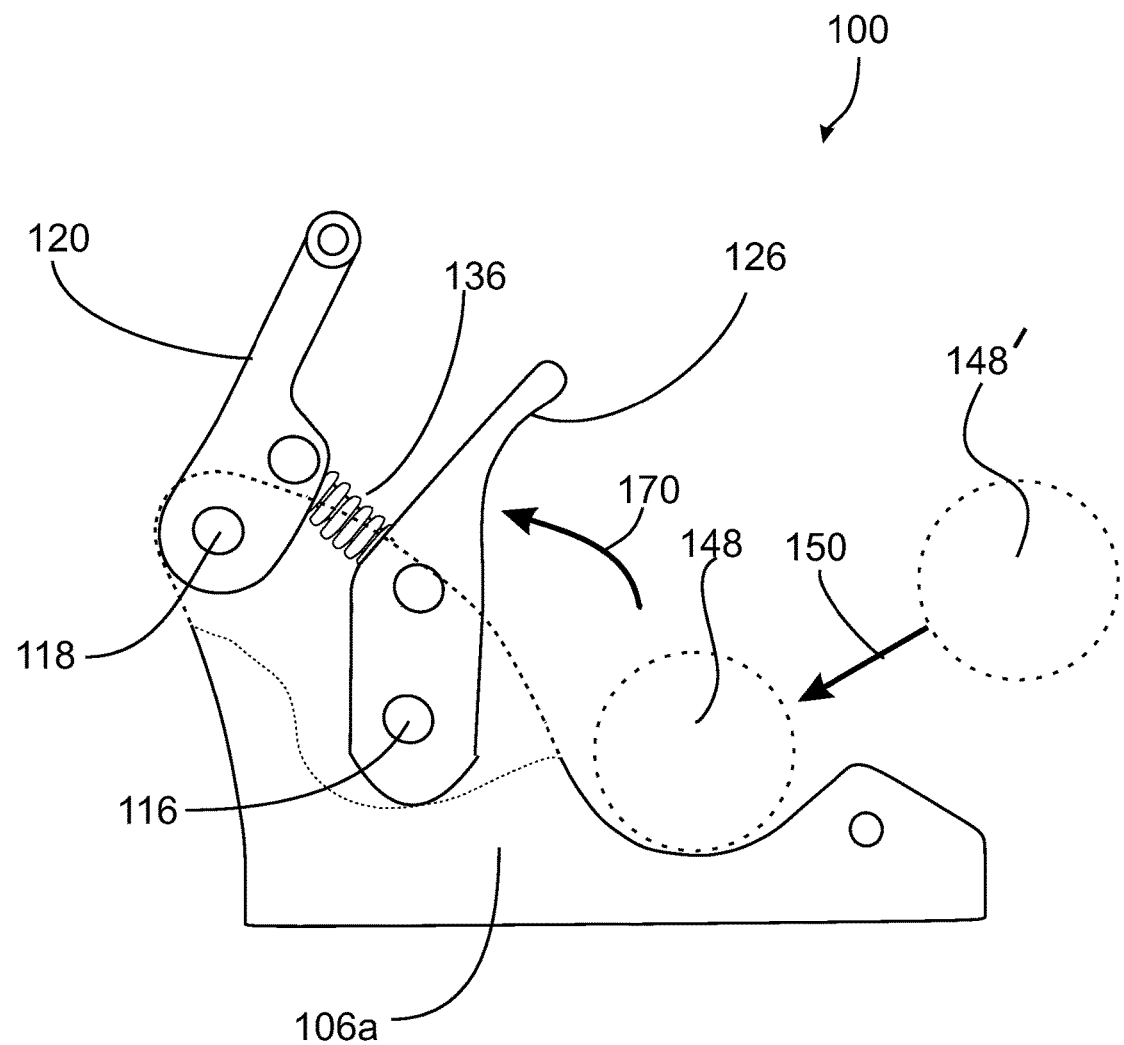
FIG. 7 is a side elevational, cutaway, schematic view of the stretcher clamp if FIG. 6 showing the position of internal components in an open, unlocked orientation.
Figure 8:
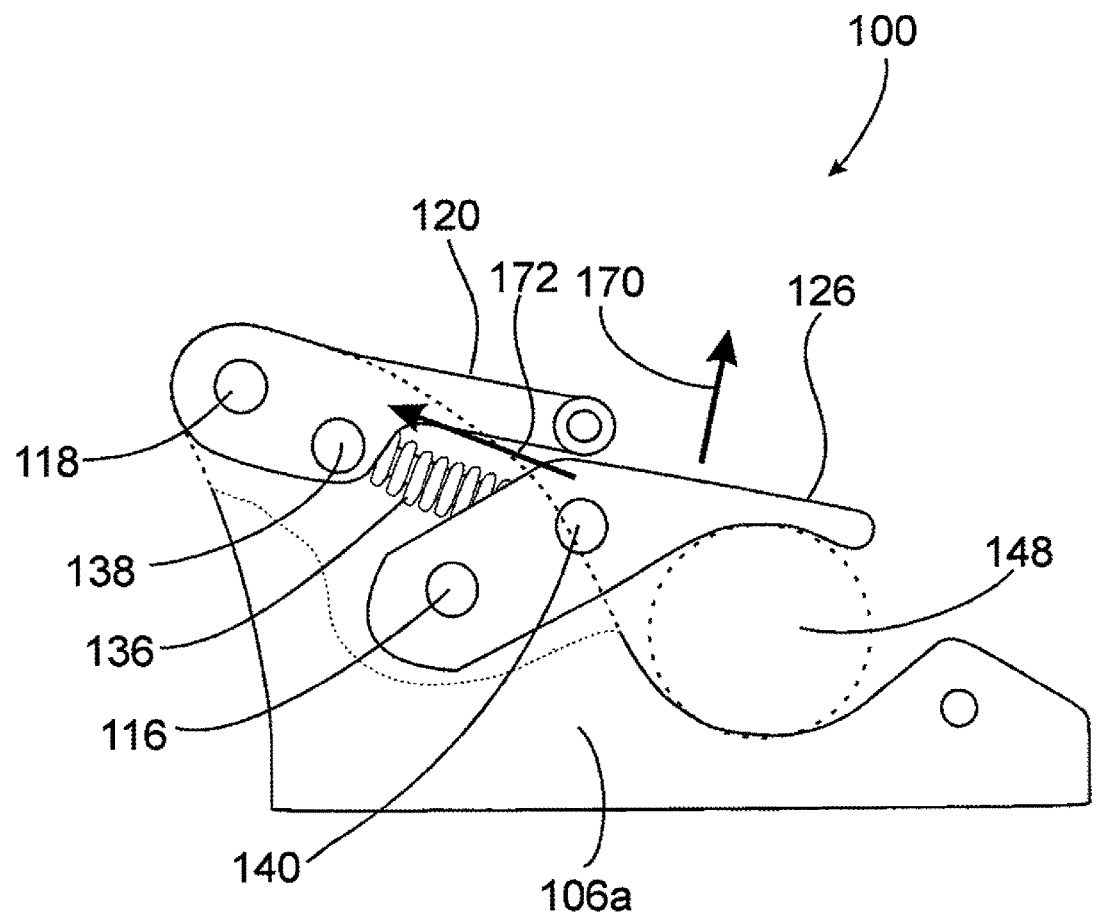
FIG. 8 is a side elevational, cutaway, schematic view of the stretcher clamp if FIG. 6 showing the position of internal components in a closed, locked orientation.

Referring now also to FIGS. 7 and 8, there are shown a side elevational, cutaway, schematic view of the stretcher clamp 100 of FIG. 6 showing the position of internal components in an open, unlocked orientation and a side elevational, cutaway, schematic view of the stretcher clamp 100 of FIG. 6 showing the position of internal components in a closed, locked orientation, respectively.

In operation stretcher clamp 100 relies on the position of linkage 154 caused by the relative positions of elongates handle retainer 126 and elongated latch handle 120.

As seen in FIG. 8, stretcher clamp 100 is shown in a latched position wherein elongated latch handle 120 is lying relatively flat against an upper surface of elongated handle retainer 126. If an attempt is made to lift elongated handle retainer 126 in the direction shown by arrow 170, linkage assembly 154 would need to move backward in the direction shown by arrow 172. Backward progress of linkage assembly 154 is blocked by upper linkage component 138 because the position of upper linkage component 138 relative to the center of rotation of elongated latch handle 120, defined by axle 118, requires freedom to rotate in a clockwise direction. Since elongated latch handle 120 is resting on elongated handle retainer 126, rotation is prohibited, and the elongated latch handle 120 and elongated handle retainer 126 remain in locked position and motion in the direction of arrow 170 is prevented.

However, as seen in FIG. 7, when elongated latch handle 120 is raised, linkage component 154 is free to move backward and upward in a counterclockwise direction, thereby allowing elongated handle retainer 126 freedom to move upward in the direction shown by arrow 170. When elongated handle retainer 126 is in a raised position, a stretcher handle 148' is free to move into stretcher clamp 100 as shown by arrow 150. Once stretcher handle 148 is in place, elongated handle retainer 126 is free to close. Once elongated latch handle 120 is again in the closed position seen in FIG. 8, stretcher clamp 100 is locked around stretcher handle 148.

The interaction of elongated latch handle 120 and elongated handle retainer 126 with linkage assembly 154 acts as a locking cam mechanism.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A stretcher clamp for releasably retaining a stretcher handle, comprising:
   a) a U-shaped base having a bottom surface, a pair of parallel edges, and a pair of upstanding sides disposed therealong perpendicularly to said bottom surface, said pair of upstanding sides being parallel to one another, each of one of said pair of upstanding sides having a curved upper edge proximate a distal end thereof and at least two through holes at corresponding, aligned locations;
   b) an elongated latch handle pivotally attached to said U-shaped base by a first axle disposed in holes of side surfaces of said elongated latch handle, said first axle being retained in a first of said at least two holes in each one of said pair of upstanding sides;
   c) an elongated handle retainer having a curved lower surface proximate a distal end thereof, said elongated handle retainer being pivotally attached to said U-shaped base by a second axle disposed in holes of side surfaces of said elongated handle retainer, said second axle being retained in a second of said at least two holes in each one of said pair of upstanding sides;
   d) a linkage assembly operatively connected to each of said elongated latch handle and said elongated handle retainer, said linkage assembly comprising:
   i) a screw connected between and operatively connected to each of said elongated latch handle and said elongated handle retainer via respective first and second pivotable linkage connectors; and
   ii) a single coil spring surrounding said screw and compressed between said first and second linkage connectors;
   whereby a cylindrical object may be retained between said curved upper surface of each of said upstanding walls and said curved lower surface of said elongated handle retainer and is secured until such time that said elongated latch handle is raised thereby moving said linkage assembly and consequently allowing said elongated handle retainer to release any cylindrical object being retained thereby.

2. The stretcher clamp for releasably retaining a stretcher handle as recited in claim 1, wherein at least one of said first axle and said second axle comprises: a hex-head bolt, at least one flat washer, and a nut.

3. The stretcher clamp for releasably retaining a stretcher handle as recited in claim 2, wherein said nut comprises a gland nut.

4. The stretcher clamp for releasably retaining a stretcher handle as recited in claim 1, wherein said elongated latch handle includes a pair for cylindrical structures disposed at a distal end thereof, said cylindrical structures protruding beyond the width of said elongated latch handle.

5. The stretcher clamp for releasably retaining a stretcher handle as recited in claim 1, wherein said first and second linkage connectors each comprise a cylindrical structure having a circumferential groove disposed proximate each of a proximal end and a distal end thereof.

* * * * *